United States Patent [19]

Bartholomew

[11] Patent Number: 4,979,400
[45] Date of Patent: * Dec. 25, 1990

[54] FORCE AND ELAPSED TIME RECORDING ASSEMBLY

[75] Inventor: Donald D. Bartholomew, Marine City, Mich.

[73] Assignee: Proprietary Technology, Inc., Southfield, Mich.

[*] Notice: The portion of the term of this patent subsequent to Feb. 21, 2006 has been disclaimed.

[21] Appl. No.: 316,411

[22] Filed: Feb. 27, 1989

[51] Int. Cl.$^5$ .................. G01D 1/12; G01D 21/02; G04F 7/00

[52] U.S. Cl. ............... 73/862.54; 73/862.39; 73/862.53; 116/203; 368/1; 368/89

[58] Field of Search ............. 73/862.53, 862.54, 762, 73/489, 862.39; 116/203, 206, 214; 368/1, 89

[56] References Cited

U.S. PATENT DOCUMENTS

| | | |
|---|---|---|
| 834,843 | 10/1906 | O'Connor . |
| 2,046,213 | 6/1936 | Schnurer . |
| 2,385,116 | 9/1945 | Trimbach . |
| 2,487,620 | 11/1949 | Waller . |
| 2,723,560 | 11/1955 | Exline . |
| 3,018,611 | 1/1962 | Biritz . |
| 3,428,362 | 2/1969 | Bertelson et al. . |
| 3,438,674 | 4/1969 | Radke et al. . |
| 3,520,124 | 7/1970 | Myers . |
| 3,692,361 | 9/1972 | Ivarsson . |
| 3,717,991 | 2/1973 | Klar . |
| 3,874,694 | 4/1975 | Stephenson . |
| 3,885,428 | 5/1975 | Dalferth . |
| 3,908,452 | 9/1975 | Rieger . |
| 3,962,920 | 6/1976 | Manske . |
| 3,966,414 | 6/1976 | Khattab et al. . |
| 4,015,015 | 3/1977 | Knowles . |
| 4,028,876 | 6/1977 | Delatorre .................. 368/89 |
| 4,084,332 | 4/1978 | Waloszyk et al. . |
| 4,085,949 | 4/1978 | Asao et al. . |
| 4,103,640 | 8/1978 | Feder . |
| 4,111,459 | 9/1978 | Magyar . |
| 4,129,321 | 12/1978 | Garvey . |
| 4,360,548 | 11/1982 | Skees et al. . |
| 4,424,509 | 1/1984 | Andres et al. . |
| 4,424,911 | 1/1984 | Resnick . |
| 4,457,251 | 7/1984 | Weman et al. . |
| 4,480,760 | 11/1984 | Schonberger . |
| 4,677,861 | 7/1987 | Bartholomew .................. 73/862.54 |
| 4,805,467 | 2/1989 | Bartholomew .................. 73/862.54 |

FOREIGN PATENT DOCUMENTS

| | | |
|---|---|---|
| 2436325 | 4/1975 | Fed. Rep. of Germany . |
| 2508728 | 9/1976 | Fed. Rep. of Germany . |
| 1433618 | 4/1976 | United Kingdom . |

*Primary Examiner*—Charles A. Ruehl
*Attorney, Agent, or Firm*—Harness, Dickey & Pierce

[57] ABSTRACT

A safety belt assembly of the present invention measures the amount of force exerted on the assembly and also the point in time when a force was exerted on the assembly. The assembly includes a first and second member associated with one another, mechanism associated with the first and second members for resiliently restraining relative movement and movably retaining said members with respect to one another; a mechanism responsive to relative movement of the first and second members for enabing a measurement of force and indicating a point in time when a force was exerted on the assembly; and a mechanism for securing the assembly to a safety belt and/or a buckle or anchor. A chemical timer for measuring the elapsed time since a force was exerted on the assembly. The chemical timer includes micro-encapsulated reactants which are frangible in response to a force exerted on the assembly for beginning reaction of a time sensitive chemical reactive system which produces a measurable change over a predetermined time period.

6 Claims, 3 Drawing Sheets

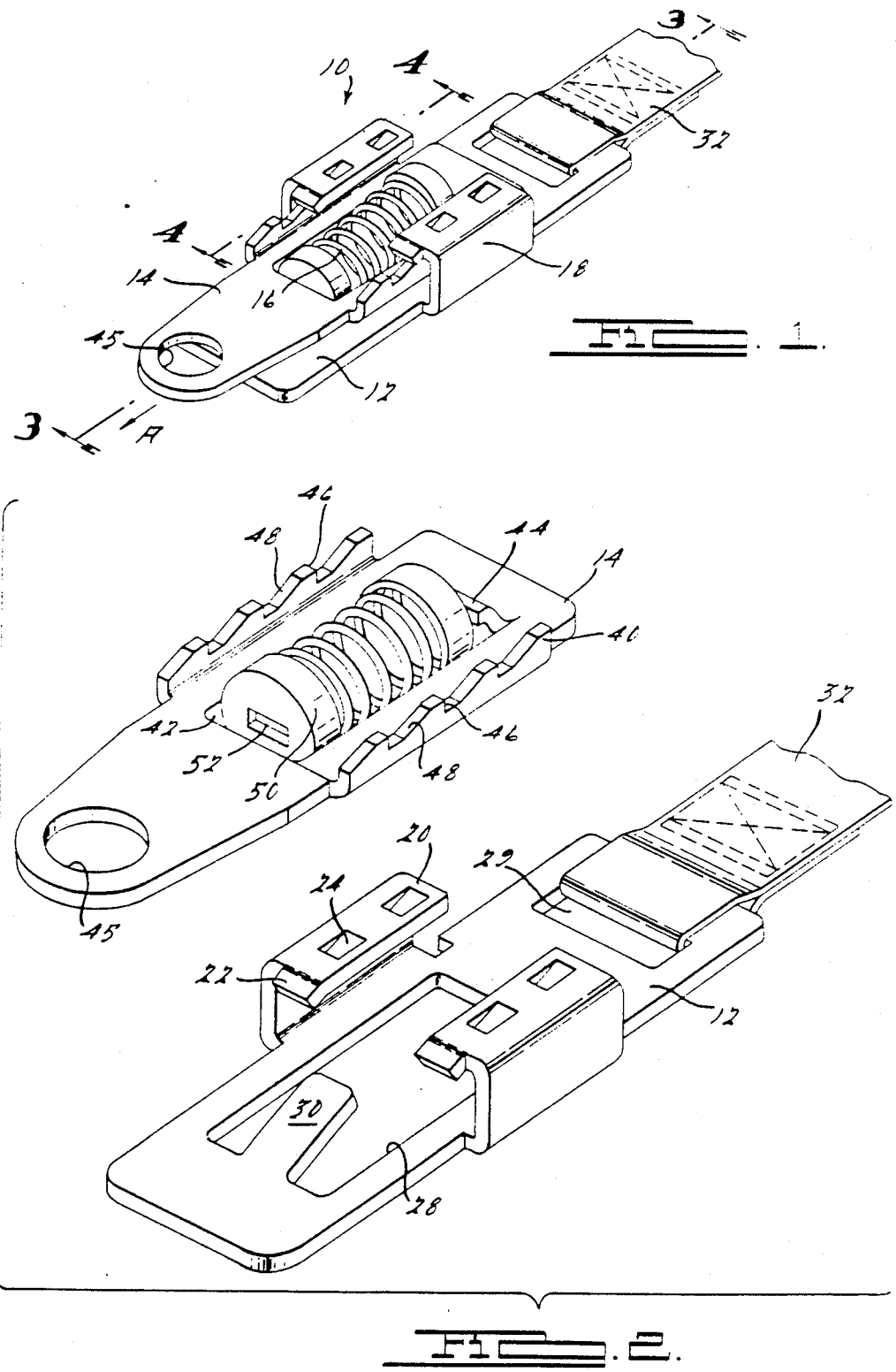

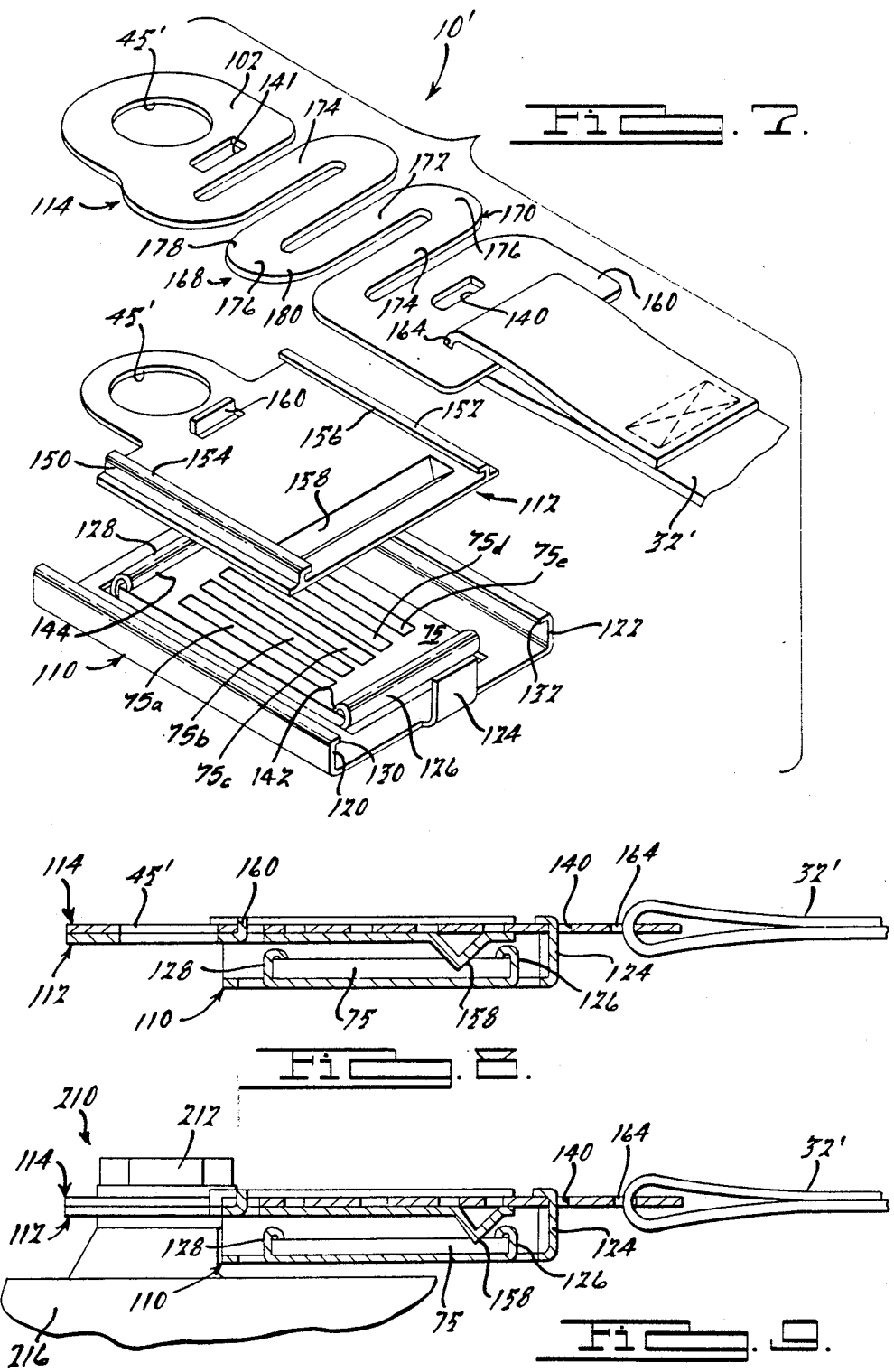

FORCE AND ELAPSED TIME RECORDING ASSEMBLY

RELATED PATENT

Cross reference is made herein to U.S Pat. No. 4,805,467 entitled "Force Recording Seat Assembly" which is incorporated herein by reference thereto.

TECHNICAL FIELD

The present invention generally relates to the field of seat belt assemblies and, more specifically, to seat belt assemblies having devices for measuring the force exerted on the belt during collisions and for indicating when the collision took place such as by an elapsed time.

BACKGROUND AND SUMMARY OF THE INVENTION

Several industries, including motor vehicle, transportation and insurance, desire to have a device in the safety belt system of a motor vehicle which will indicate whether or not the safety belt was worn during an impact collision. Also, if the device was worn, when the collision occurred. In the past, the loading could only be determined when the belt was abraded, chafed or if the metal supports were bent or broken. However, many vehicle collisions are not severe enough as to bend or break the metal supports since they are made of very durable material. Thus, by a visual examination of a built-in safety belt assembly, it is not always possible to determine if the safety belt assembly was subject to a collision or if excessive forces had been exerted on the assembly.

In other industries it may be desirable to monitor shipping and handling of goods such that should damage to the goods occur the time of undue damage could be ascertained.

In order to overcome the inability to determine whether or not a safety belt was worn during a collision, it is one of the primary objects of the present invention to provide a safety belt assembly which determines the amount of force exerted on the safety belt assembly.

An additional objective of the present invention is to provide a chemical timer which will indicate elapsed time since the point in time when the excessive force was exerted on the safety belt assembly.

It is still further an objective of the present invention to provide an assembly which is responsive to forces exerted on items during shipping and the like which will indicate excessive force caused by mishandling or accidents during shipment of a product and the elapsed time, since such a force occurred.

To achieve the foregoing objectives, the assembly according to the present invention includes a first and second plate associated with one another; a flat elongated biasing member associated with the plates for resiliently restraining relative movement and movably retaining the plates with respect to one another; a mechanism responsive to relative movement of the plates for enabling a determination of an amount of force or responsive to relative for enabling a determination of when a predetermined limit of force has been exceeded or exerted on the assembly; and a mechanism for securing the assembly to a conventional safety belt and buckle or to a shipping container or goods to be monitored.

Also disclosed is a mechanism substantially similar to the above described assembly having a mechanism responsive to movement of the plates for indicating a point in time when a force was exerted on the assembly. Further, an assembly including both a mechanism for enabling a determination of an amount of force exerted on the assembly combined with a reactive chemical system for indicating elapsed time since a predetermined force was exerted on the assembly is disclosed.

From the following description and claims, taken in conjunction with the accompanying drawings, other objects and advantages of the present invention will become apparent to one skilled in the art.

BRIEF DESCRIPTION OF THE DRAWINGS

FIG. 1 is a perspective view of the safety belt assembly made in accordance with a first embodiment of the present invention.

FIG. 2 is an exploded view of FIG. 1;

FIG. 7 is an exploded perspective view of a safety belt assembly made in accordance with another embodiment of the present invention;

FIG. 8 is a cross-sectional view along lines 8—8 of FIG. 7 thereof;

FIG. 9 is a partial cross-sectional view of a safety belt assembly made in accordance with another embodiment of the present invention.

DETAILED DESCRIPTION OF THE INVENTION

Figure 3:
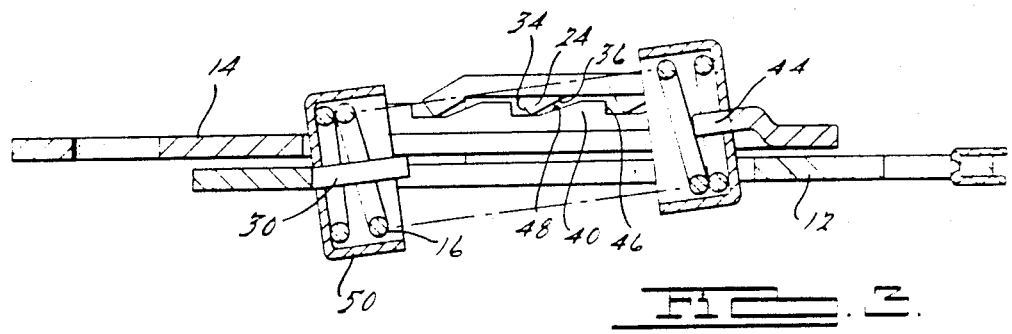
FIG. 3 is a cross-sectional view along lines 3—3 of FIG. 1.
Figure 4:
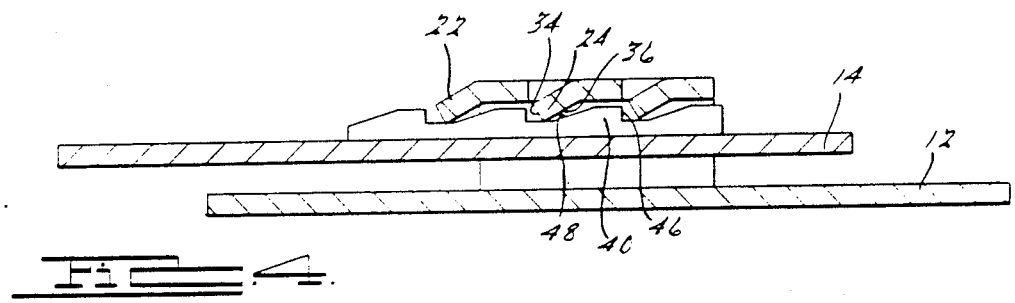
FIG. 4 is a cross-sectional view along lines 4—4 of FIG. 1.

A seat belt assembly for recording force exerted on the assembly is generally illustrated in FIGS. 1 and 2 and is designated with the reference numeral 10. The seat belt assembly 10 includes a first plate 12, a second plate 14 and a resilient biasing member 16. A pair of retainers 18 are on the first plate 12 for maintaining the second plate 14 in a movable relationship with the first plate 12.

The first plate 12 has an overall rectangular configuration as seen in FIG. 2. The retainers 18 extend vertically from the plate 12 forming a pair of guide walls for positioning the second plate 14 in a substantially parallel plane relationship with the first plate 12. The first plate 12 has an aperture 28, which has a tongue 30 projecting into the aperture 28, for positioning the biasing member 16 between the plates 12 and 14. The aperture 28 is preferably rectangular and is positioned between the retainers 18 on the first plate 12. A second aperture 29 is in the first plate 12 for securing the first plate 12 to a conventional automobile safety belt 32. The aperture 29 enables the safety belt 32 to be placed through the first plate 12 and attached to itself for permanently securing the first plate 12 onto the belt 32.

The retainers 18 have a flange 20, extending horizontally from the retainers 18, which is substantially parallel to the first plate 12. The flanges 20 have at least one or more fingers 24 projecting from the interior surface of the flange 20. The flanges 20 have a descending tit 2 which substantially functions the same as the fingers 24 which will be further discussed herein.

The fingers 24, on the interior surface of the flange 20, descend at a desired angle. The fingers 24 are generally formed by a U-shaped cut in the flanges 20. The material within the U-cut is bent downward towards the first plate 12 forming the fingers 24. The fingers 24 have a back stop 34 which enable one way movement of the second plate 14. The fingers 24 have an annular wall 36 which enable the second plate 14 to slide one way against the fingers 24 before the backstop 34 traps the second plate 14 prohibiting movement of the second plate in a reverse direction. The fingers 24 enable the second plate 14 to move incrementally in the first plate 12.

The tongue 30 projects annularly above the aperture 28. The tongue 30 acts as a stop to secure the biasing member 16 on the first plate 12 in the assembly 10. Also, if a force of extreme magnitude is applied to the assembly 10 the tongue 30 will come into contact with the second plate 14 prohibiting further movement of the second plate 14.

The second plate 14 has an overall rectangular configuration as best seen in FIG. 2. At least one or more fingers 40 project vertically from the second plate 14. The second plate 14 has an aperture 42 which has a tongue 44 projecting into the aperture 42. The aperture 42 is preferably rectangular and enables the resilient biasing member 16 to communicate with the first and second plates 12 and 14. A second aperture 45 is in the second plate 14 for securing the assembly 10 to a conventional buckle (not shown).

The fingers 40 include an inclined wall 48 and a backstop 46. The fingers 40 intermesh with the fingers 24 enabling the second plate 14 to move, in the direction of arrow A, incrementally in the first plate 12. The incremental movement occurs as follows. The inclined wall 48 slides against the wall 36 until backstop 46 passes the wall 36, wherein the backstop 46 comes into contact with the backstop 34. This abutting of the backstops 34 and 46 prohibits movement of the second plate 14 in a reverse direction. The intermeshing of fingers 24 with fingers 40 provides the assembly 10 with a ratchet interface between the two plates 12 and 14. Thus, as the second plate 14 moves, the fingers 40 will ratchet along fingers 24 incrementally moving the second plate 14 in the first plate 12.

The resilient biasing member 16, positioned between apertures 28 and 42, is in communication with the first and second plates 12 and 14, holding the plates 12 and 14 in a first relaxed position, as best seen in FIG. 1. The resilient biasing member 16 is preferably a helical spring. The biasing member 16 has a pair of caps 50, one on each end of the spring, for equal distribution of the spring force. The caps 50 have apertures 52 which enable the biasing member to be positioned on the tongues 30 and 44. The biasing member 16 supplies a resistive force to the plates 12 and 14 which keeps the fingers 24 and 40 in contact with one another.

Figure 5:
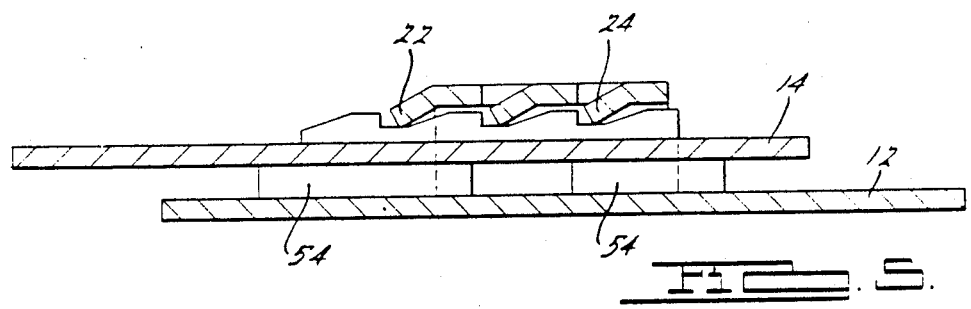
FIG. 5 is a cross-sectional view illustrating a time indicator made in accordance with the present invention.

The time indicator 54, best seen in FIG. 5, may be an electrical means, mechanical means, or a chemical means which will determine when a force was exerted on the safety belt assembly 10. An electrical means could include a starting mechanism and a conventional digital watch assembly having an elapsed time counter. Preferably, a chemical device is used which decays at a determined measurable rate. This decay provides the analyst with a simple determination as to when the force occurred from knowing the initial concentration, the decay rate and the remaining concentration of the chemical.

The time indicator 54 is positioned in communication with the plates 12 and 14. Preferably, the time indicator 54 would be positioned between plates 12 and 14 on one side of apertures 28 and 42. The time indicator 54 may be an encapsulated foam having an exterior coating and a predetermined amount of chemical within the foam. Once a force is exerted on the indicator 54, strong enough to break through the encapsulated coating, the chemical will begin to decay in the presence of atmospheric conditions. Thus, when analyzed, the time indicator 54 will determine when the excessive force was exerted on the safety belt assembly 10.

Figure 6:
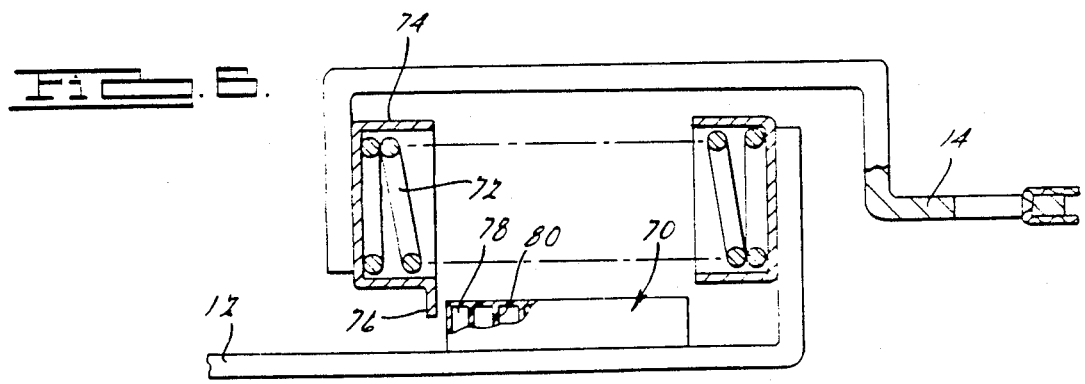
FIG. 6 is a cross-sectional view of a second embodiment of a time indicator made in accordance with the present invention.

In a second embodiment of the present invention, best seen in FIG. 6, the time indicator 70 is in communication with a biasing member 72. The biasing member 72, preferably a helical spring, has a housing 74 around its circumference. The housing 74 has a flange 76. In this embodiment the biasing member 72 returns to a relaxed position after every compression. The flange 76 is positioned in a line of contact with the time indicator 70 as the biasing member 72 is compressed. The time indicator 70 includes several encapsulated pockets 78. A wall 80 separates the pockets 78 from one another. As the biasing member 72 is compressed the flange 76 slides over the encapsulated time indicator 70. As this happens, the flange 76 breaks through the encapsulated coating, enabling individual pockets 78 of the time indicator 70 to decay. This breakthrough occurs through one pocket 78 at a time. Thus, as small forces are exerted on the assembly 10, the flange 76 may break through only one pocket 78. When an excessive force is exerted on the assembly 10, the flange 76 will break through several pockets 78. A decay analysis of the remaining chemicals in each pocket 78 will determine the time when each pocket 78 was broken. The more pockets 78 broken through at one time will indicate a large amount of force exerted on the assembly 10 at that time. Thus, the analyst will be able to determine when the force occurred. Also, the analyst will be able to determine the force exerted on the assembly by measuring the distance traveled by the biasing member 72 along the time indicator 70.

In the present invention the assembly 10 is assembled as shown in FIG. 1. The second plate 14 is secured, by aperture 44, in a conventional safety belt buckle (not shown). A force is exerted on the assembly 10 which has a magnitude large enough to activate the assembly 10. The second plate 14 slides, in the direction of arrow A, in the first plate 12. This slide measures the force exerted on the assembly and the point in time when the force was exerted.

The slide occurs as follows. The second plate fingers 40 are intermeshed with the first plate fingers 24. As the force is exerted, the second plate fingers 40 ratchet on the first plate fingers 24 moving, in the direction of arrow A, in accordance with the force exerted. The second plate back stop 46 comes into contact with a first plate back stop 34 halting the movement of the second plate 14 in a reverse direction. As this happens, the biasing member 16 compresses between the tongues 30 and 44 trapping the biasing member 16 in a compressed state. This compressed state records the force exerted on the assembly 10. Also, as the second plate 14 ratchets in the first plate 12, the time indicator 54 is activated. The second plate 14 compresses the encapsulated time indicator 54, breaking through the coating, exposing the chemical to atmospheric conditions, beginning chemical decay. The amount of decay is used to determine when the exertion of force occurred.

In an alternate embodiment of the present invention the chemical timers useful herein may comprise chemical reactants of a reactive chemical system which produces a measurable change in physical properties over a predetermined time. The chemical reactants are separated prior to the occurrence of a force. The reactants will become combined through operation of the time indicator 54,70 as set forth above. Preferably, this is accomplished by impregnating the foam of the time indicator 54 with a mixture of micro-encapsulated chemical reactants of a reactive system, which when combined will produce a measurable result either over a predetermined finite time period or preferably a result that can be calibrated and measured consistently along intervals of a predetermined time span. For instance, it is within the scope of the present invention to use components of known chemical systems which provide for a relative change in appearance, transparency, color, odor, luminescence or other properties which can be readily measured either by the naked eye or through suitable analytical instruments. Preferably, a visible change, such as color, over a period of time, would be present such that the change of color over a period of time may be measured by reference to a pre-calibrated visual aid. Thus, comparing the color of the time indicator with the predetermined color on the visual aid would give an elapsed time range since the force was applied to the mechanism.

Some examples of chemical reactants of time reactive systems which may be micro-encapsulated and advantageously utilized in the present invention include those reactants and products shown in U.S. Pat. No. 3,520,124 to Myers; U.S. Pat. No. 3,018,611 to Biritz; and U.S. Pat. No. 3,966,414 to Kattab et al., the disclosures of which are herein incorporated by reference thereto.

Other possible reactants may include the micro-encapsulation of the chemical reactant components of the Cyanalume ® luminescent light stick, whereby upon rupture of the micro-encapsulated particles a luminescence would be produced which would generally deteriorate over a period of time.

Micro-encapsulation technology is well known in the art. However, for use in the present invention the micro-encapsulation technique used must produce readily frangible micro-capsules such that the operative chemical reactants will be combined by mechanical disruption as disclosed above. Some useful techniques are described in U.S. Pat. No. 4,083,949, column 4 (also see the references disclosed therein) and James E. Flinn and Herman Nock, Chemical Engineering, pp. 171–176 (Dec. 4, 1967). Other techniques will be apparent to those skilled in the art.

These micro-encapsulated reactants may be suitably formulated in proper proportions to form an un-reacted chemical system employed in the above system such as by impregnating the foam of time indicator 54, by filling the pockets 78 of time indicator 70 or by employing the micro-encapsulated reactants in a suitable coating on the surface 125 of timer member 75 (see FIGS. 7-9). In each of these structures the mechanical force, with respect to the movement caused by a force acting on the mechanism disclosed above, is transferred to the un-reacted micro-encapsulated reactants for fracturing of the micro-capsules containing these reactants thereby releasing these reactants and initiating the chemical reaction.

As an example, utilizing the teachings of U.S. Pat. No. 3,520,124 to Myers, several mixtures of the micro-encapsulated reactants therein would be formulated for "timing out" at discreet intervals (every 2 hours for instance). These mixtures could be placed in a suitable medium and painted in the form of stripes 75a, 75b, 75c, 75d, 75e across the member 75 such that movement of the scraper (as disclosed below) would activate all systems at once (i.e., 2 hour time out, 4 hour time out, etc.) by placing the stripes in a predetermined location the observer could determine the 2 hour range indicating approximate elapsed time. Thus, if ½ hour, 1 hour, 2 hour, 4 hour, 6 hour and 8 hour stripe coatings are applied (75a, 75b, 75c, 75d, 75e, in FIG. 7 respectively), the user can determine by observing the stripe color which time intervals have elapsed since the force was applied (i.e., looking for the prominent yellow to dark blue color change, of Example I of U.S. Pat. No. 3,520,124 to Myers).

The force exerted will be measured by conventional spring equations since the spring constant and the linear displacement of the spring will be known. The time when the force was exerted will be determined by an analysis of the amount of the chemical remaining with respect to its known dissipation rate and the original chemical concentration or in the case of the reactive system by comparing the physical property with a pre-calibrated scale thereby measuring elapsed time and extrapolating back to the type of initial force.

Once the analyst has determined the amount of force exerted on the assembly 10, and at what point in time the force was exerted on the assembly 10 he may reset the assembly 10 for further use. This is done by replacing the time indicator 54 and resetting the biasing means 16 and fingers 24 and 40 back to their relaxed positions. Thus, the assembly 10 is ready to be reinstalled in a vehicle.

FIGS. 7–9 illustrate further embodiments of the present invention. Corresponding elements of the invention will be marked with reference numerals having primes, which relate to the same element as previously described.

Turning to FIGS. 7 and 8, another embodiment of a recording force seat belt assembly is illustrated and designated with the reference numeral 10'. The assembly includes a first plate member 110 associated with a second plate member 114, both of which, are, in turn, associated with a biasing member 114. A belt 32' is secured to the biasing member 114 for securing the assembly 10' to the safety belt 32'. An aperture 45' is positioned in the biasing member 114 and plate member 112 for enabling the assembly 10' to be secured to a conventional seat belt buckle and/or anchor (not shown).

The plate member 110 has an overall rectangular shape having a pair of guide walls 120 and 122 formed on the longitudinal edges of the plate member 110. A mechanism 124 projects from the plate 110 and couples the plate 110 with the biasing member 114. Generally, mechanism 124 is positioned on one of the lateral ends of the plate member 110. Also, the plate member 110 includes mechanisms 126 and 128 for restraining a timer member, such as a chemical timer described above, which may also be used as a force indicator, or a force determining indicator 75, into the plate member 110.

The guide walls 120 and 122 project substantially perpendicular to the plate member 110 and have extending flanges 130 and 132 projecting substantially parallel to the plate member 110. The guide walls 120 and 122 enable the second plate member 112 to movably slide in the first plate member 110. The mechanism 124 is generally a projecting tab extending from the plate member 110 having a desired curvature for retaining the plate member 110 in an aperture 140 in the biasing member 114. The mechanisms 126 and 128, retaining the timer member or the force determining indicator in the first plate member 110, project from the plate member 110 and include flanges 142 and 144 for securing the timer member or force determining indicator within the plate member 110.

The plate member 112 includes guide members 150 and 152 projecting substantially perpendicular to the plate member 112 and having flanges 154 and 156 extending substantially parallel to the plate member 112. The guide members 150 and 152 enable the second plate member 112 to movably slide in the first plate member 110. A member 160 projects at a desired curvature from the plate member 112 enabling securement of the plate member 112 to the biasing member 114 via aperture 141.

The plate member 112 includes a wiper member 158 which strikes the force determining indicator or timer member of the first plate 110 for indicating the distance travelled by the biasing member 114 or starting the running of time when a force was applied to the assembly. The wiper member 158 depends from the bottom of the plate 112 and contacts the force indicator or timer member, as will be described herein. The biasing member 114 may be formed with any suitable metallic sheet material having requisite strength and resilient characteristics. The biasing member 114 has a desired width and thickness such that a desired spring constant may be obtained from the material. Generally, the width of the biasing member 114 controls the stiffness of the biasing member 114 for a given material thickness. The length of the biasing member 114 controls the longitudinal deflection of the biasing member 114, which occurs in two primary modes prior to failure. To increase longitudinal deflection to the biasing member 114 without increasing the overall non-deflected length of the biasing member, the width of the biasing member 114 may be increased, which, in turn, enables an increase in longitudinal deflection while maintaining a constant spring length during non-deflection. The biasing means 114 generally employs a width to thickness cross-section ratio of three or more. The spring may include several spring constants. One of the spring constants may be used as a shock absorbing feature having a substantially lower spring constant than the other spring constants. This lower spring constant reduces the rate of energy absorption by the device and thereby reducing the stresses applied to the buckled-in occupant.

Generally, the biasing member 114 has an overall flat, elongated, rectangular shape. The end portions 160 and 162 are integrally formed onto the ends of the biasing member 114. The end portions have means 164 and 45' for attaching the biasing member to a belt and/or anchor buckle, respectively. The biasing member 114 may be formed from a metallic strip by stamping or otherwise achieving a serpentine configuration into the strip. The achieving of the serpentine configuration removes portions of the strip from in between the curved U-shaped members of the serpentine configuration.

The serpentine configuration is formed from reversing U-shaped members 168 and 170 sharing a common leg with the next reversing U-shaped member. The serpentine configuration enables the biasing member 114 to deflect in a longitudinal axial direction. The reversing U-shaped members 168 and 170 include legs 172 and 174, base 176 and curvatures 178 and 180 connecting the legs 172 and 174 to the base 176. The width of the legs 172 and 174, base 176, and curvatures 178 and 180, along with the thickness of the strip, control the spring constant of the biasing member 114. Choosing the desired leg length, base, material, and thickness provides the spring with the desired spring constant pattern. A further explanation of the spring of the present invention is given in U.S. patent application Ser. No. 916,155, filed Oct. 7, 1986, entitled "Serpentine Strip Spring", the disclosure of which is herein expressly incorporated by reference.

FIG. 9 illustrates another embodiment of the present invention. In FIG. 9, the seat belt assembly 210 is modified to be secured by a fastening means 212, such as a bolt, to a vehicle floor pan 216. The biasing member 114 has an aperture for enabling the bolt 212 to pass therethrough securing the assembly 210 to vehicle floor pan 216. The assembly 210 is thus substantially the same as the assembly 10' above, and the element will be designated with the same reference numerals.

The seat belt assemblies 10' and 210 generally function as follows. The assemblies 10' and 210 are secured between two portions of a seat belt. When a force is exerted on the assemblies, the biasing member 114, if the force is large enough, begins to extend in a longitudinal direction. As this extension occurs, the wiper member 158 contacts the force indicator and/or timer member 75. If only a force determining indicator is used, the wiper member 158 will contact the force determining indicator 75 and a mark will be etched onto the indicator, indicating the longitudinal distance travelled by the spring. As explained above, using conventional spring equations, knowing the distance travelled by and the spring constant of the biasing member 114, the force exerted on the belt can easily be determined. When a timer member 75 is used, the timer member is activated, starting the running of time as the wiper member 158 contacts the timer member 75. Also, the force exerted may be determined from the distance travelled by the wiper along the timer member. Thus, by using a timer member 75, both the point in time when force was exerted on the assemblies 10' and 210 and also the amount of force which was exerted on the assemblies 10' and 210 may be determined.

While the present invention is illustrated as being applicable to determination of times of forces applied to seat belt assemblies, it is within the scope of the present invention that other uses, where it may be necessary to determine when and/or how much force is imparted on a workpiece, may be advantageous and are equally met by the subject invention. For instance, damage during shipping could be monitored by using the present invention essentially to detect severe "jars" to goods shipped by carrier. In such an embodiment, one of the movable plates could be affixed to the container while the other may be attached to the goods itself (if they are free standing inside the container) or a weight could be attached thereto. Such that should a force be exerted on the assembly beyond a predetermined value, the plates would move relative to one another for beginning the chemical reaction as disclosed above. Thus, such an embodiment would act as a severe motion detector such that if jarring of the goods occurs it would be possible to determine at what time during the shipping and handling process the damage occurred.

While the above disclosure fulfills the embodiments of the present invention, it will become apparent to those skilled in the art that modifications, variations and alterations may be made without deviating from the scope and fair meaning of the subjoined claims.

What is claimed is:

1. A safety belt assembly for measuring the point in time when a force was exerted on the assembly, said assembly comprising:

a first and second member;

a flat elongated biasing means in communication with said first and second members for resiliently restraining relative movement and movably retaining said members with respect to one another;

means responsive to relative movement of said first and second members for indicating a point in time when a force was exerted on said assembly, said means for indicating the point in time when a force was exerted comprises a wiper means and a chemical reactant means, said chemical reactant means comprising at least a first micro-encapsulated chemical reactant and a second micro-encapsulated chemical reactant of a time sensitive chemical reactive system, said system operable for producing a measurable physical result over a predetermined period of time, said wiper means activating said chemical reactant means by mechanically fracturing said micro-encapsulated first and second reactants for combining thereof.

2. The safety belt assembly according to claim 1 wherein said biasing means further comprises means for securing said assembly onto a belt and buckle and a serpentine biasing portion formed from a metallic strip material.

3. The safety belt assembly according to claim 1 wherein said members being slideably associated with one another.

4. A safety belt assembly for measuring the force exerted and indicating the point in time when a force was exerted on the assembly, said assembly comprising:

a first and second member;

a flat elongated biasing means in communication with said first and second members for resiliently restraining relative movement and movably retaining said first and second members with respect to one another;

means responsive to relative movement of said first and second members for enabling a determination of an amount of force exerted on said assembly and for indicating a point in time when a force was exerted on said assembly, said means for indicating the point in time when a force was exerted comprises a wiper means and a chemical reactant means, said chemical reactant means comprising at least a first micro-encapsulated chemical reactant and a second micro-encapsulated chemical reactant of a time sensitive system, said system operable for producing a measurable physical result over a predetermined period of time, said wiper means activating said chemical reactant means by mechanically fracturing said micro-encapsulated first and second reactants for combining thereof;

means for securing said assembly into a buckle; and means for securing said assembly onto a belt.

5. The safety belt assembly according to claim 4 wherein said biasing means includes said means for securing said assembly onto a belt and buckle and a serpentine biasing portion formed from metallic strip material.

6. An assembly for responding to a predetermined force exerted on an article to be monitored for an excessive force for indicating the elapsed time since the point in time when a force was exerted on the article, said assembly comprising:

a first and second member;

a biasing means in communication with said first and second members for resiliently restraining relative movement and movably retaining said first and second member with respect to one another;

means responsive to relative movement of said first and second members for responding to a predetermined amount of force exerted on said assembly and for indicating the elapsed time since a point in time when the predetermined force was exerted on said assembly said means for indicating the elapsed time since the point in time when the predetermined force was exerted comprising a wiper means and a chemical reactant means, said chemical reactant means comprising at least a first micro-encapsulated chemical reactant stripe and a second micro-encapsulated chemical reactant stripe of a time sensitive chemical reactive system, said stripes positioned side by side, said system operable for producing a measurable physical result over a predetermined period of time such that each stripe indicates a different elapsed predetermined time period, said wiper means activating said chemical reactant means stripes at the same time by mechanically fracturing said micro-encapsulated first and second reactant stripes for combining thereof such that an observer may determine by observing said stripes which time periods have elapsed since activation; and means for affixing said assembly in operable association with said article for allowing a predetermined force exerted on said article to provide said relative movement of said first and second members of said assembly.

* * * * *